United States Patent
Pavithran et al.

(10) Patent No.: US 11,573,151 B2
(45) Date of Patent: Feb. 7, 2023

(54) SYSTEM AND METHOD FOR DETERMINING THE AMPLITUDE OF OSCILLATORY INSTABILITIES IN FLUID MECHANICAL DEVICES

(71) Applicant: Indian Institute of Technology Madras (IIT Madras), Chennai (IN)

(72) Inventors: Induja Pavithran, Kannur (IN); Vishnu Rajasekharan Unni, Palakkad (IN); Alan John Varghese, Aluva (IN); Praveen Kasthuri, Trichy (IN); Raman Pillai Indusekharan Nair Sujith, Chennai (IN)

(73) Assignee: INDIAN INSTITUTE OF TECHNOLOGY MADRAS (IITM), Chennai (IN)

( * ) Notice: Subject to any disclaimer, the term of this patent is extended or adjusted under 35 U.S.C. 154(b) by 0 days.

(21) Appl. No.: 16/633,657

(22) PCT Filed: Jul. 23, 2019

(86) PCT No.: PCT/IN2019/050535
§ 371 (c)(1),
(2) Date: Jan. 24, 2020

(87) PCT Pub. No.: WO2020/021565
PCT Pub. Date: Jan. 30, 2020

(65) Prior Publication Data
US 2021/0131910 A1    May 6, 2021

(30) Foreign Application Priority Data
Jul. 25, 2018 (IN) ............................ 201841027977

(51) Int. Cl.
*G01M 5/00* (2006.01)
*G01M 15/14* (2006.01)
*G05D 19/02* (2006.01)

(52) U.S. Cl.
CPC ........ *G01M 5/0066* (2013.01); *G01M 5/0008* (2013.01); *G01M 5/0025* (2013.01); *G01M 15/14* (2013.01); *G05D 19/02* (2013.01)

(58) Field of Classification Search
CPC combination set(s) only.
See application file for complete search history.

(56) References Cited

U.S. PATENT DOCUMENTS

| 2005/0021298 A1* | 1/2005 | Junk | G05B 23/0229 |
| | | | 702/183 |
| 2012/0283982 A1* | 11/2012 | Englund | G05D 19/02 |
| | | | 702/124 |
| 2017/0051683 A1* | 2/2017 | Murugesan | F23M 11/04 |

\* cited by examiner

Primary Examiner — Brandi N Hopkins

(57) ABSTRACT

Embodiments herein provide a system (100) to estimate the amplitude of oscillations in a turbulent flow system (102) that exhibits oscillatory instabilities. The system (100) comprises of a sensor (102A) mounted on the turbulent flow system (102) to detect an oscillatory variable in the system obtaining a signal, a signal conditioner (104) that conditions the signal from the sensor, an amplitude estimator (110) that estimates the amplitude of the limit cycle oscillations, and also predict the proximity of the system to the oscillatory instability, a processor (108) connected to the amplitude estimator (110) to compare the predicted oscillation amplitude with a threshold value. The amplitude is estimated by estimating the spectral measure of the time series signal obtained from the system.

11 Claims, 2 Drawing Sheets

SYSTEM AND METHOD FOR DETERMINING THE AMPLITUDE OF OSCILLATORY INSTABILITIES IN FLUID MECHANICAL DEVICES

FIELD OF INVENTION

The invention relates to a system and a method for determining the amplitude of oscillatory instabilities in industrial devices. In particular, the invention pertains to oscillatory instabilities in turbulent flow systems such as, gas turbine engines, wind turbines and structural elements facing turbulent flows. This application is based on, and claims priority from an Indian Application Numbers PCT/IN2019/050535 filed on 23 Jul. 2019 and 201841027977 filed on 25 Jul. 2018.

BACKGROUND OF INVENTION

Many systems and devices that embody a fluid flow exhibit large amplitude oscillatory instabilities that adversely affect the performance and life span of the system and/or device. Predicting the onset of such instabilities and their amplitude is difficult, since the processes that cause instabilities in the system are very complex. Thus, prognosticating these instabilities is a challenging task for industries. A system that can forewarn the onset of such instabilities and estimate the amplitude of the resulting oscillations can help operators to take appropriate control action to safeguard the system form instability.

Flame transfer function or flame describing function form the basis for most conventional methods for estimating amplitudes of oscillatory instabilities. Nonlinear heat release models as well as acoustic losses at the boundaries have also been used for amplitude determination. The accuracy in the prediction of the limit cycle amplitude of acoustic pressure in the aforementioned methods is sensitive to both the Flame Describing Function (FDF) and the acoustic boundary conditions. In industrial systems operating at high pressure, it is often hard to excite large amplitude oscillations that are needed for determining the flame describing function.

Thus, there exists a compelling need to develop an apparatus and a method to predict the amplitude of limit cycle oscillations that can be used in industrial systems without much difficulty, i.e. without obtaining the flame describing function. Hence, there exists a need for a system and a method that could predetermine the instability and control various parameters of the device accordingly, to prevent the system from entering an operational regime where it becomes unstable, thus improving the stability margins.

OBJECT OF INVENTION

The principal object of the embodiments herein is to provide a method to estimate the amplitude of limit cycle oscillations in a class of systems with turbulent flow that encounter oscillatory instabilities.

Another object of the embodiments herein is to provide an apparatus to predict the amplitude of oscillations during the oscillatory instability, so that operator may appropriately monitor and control the system. This technique for the prediction of the amplitude helps implement a stability margin for the large amplitude periodic oscillations which are often detrimental to fluid dynamic devices.

These and other objects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications are made within the scope of the embodiments herein without departing from the spirit thereof, and the embodiments herein include all such modifications.

SUMMARY

Accordingly, the embodiments herein refers to an apparatus to estimate the amplitude of oscillations in a system with turbulent flow that exhibits oscillatory instabilities. The apparatus comprises of a sensor mounted on the system to detect an oscillatory variable in the system, includes an analog to digital convertor (A/D convertor) that converts the electrical signals received from the signal conditioner that conditions the signal from the sensor, an amplitude estimator that estimates the amplitude of the limit cycle oscillations, and also predict the proximity of the system to the oscillatory instability, a processing unit connected to the amplitude estimator to compare the predicted oscillation amplitude with a threshold value as defined by the operator; characterized in that the amplitude of the limit cycle oscillations is estimated by estimating the spectral measure of the time series signal obtained from the system; and a controller to control the oscillatory variable based on the instructions received from the processing unit through the control device connected to the system.

Embodiments herein are directed to a method of estimating the amplitude of limit cycle oscillations for systems susceptible to oscillatory instabilities comprising the steps of detecting an oscillatory variable causing the oscillations using a sensor mounted on the system and converting the signal into digital signals in an analog-digital convertor. The method further includes estimating the amplitude of the limit cycle oscillations using an amplitude estimator from data obtained from the said analog-digital convertor, comparing the estimated value of the amplitude of limit cycle oscillations with a threshold value for the system and creating appropriate instructions for controlling the system parameters to restore stable operation and restoring the stability of the system by suitably adjusting the system parameters.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure as defined by the appended claims.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of the ways in which the embodiments may be practiced and to further enable those of skill in the art to practice the embodiments. For example, although, certain embodiments herein are related to the system and method for early detection of instabilities in devices such as combustors in gas turbines, and industrial processing devices such as furnaces and burners for the ease of understanding the invention, it should be noted that the system according to the present invention may also be used for any other devices in which the transition to oscillatory instability from chaotic behavior happens though intermittent bursts.

Further, although, certain embodiments herein are related to the system and method for detecting and preventing oscillatory instabilities in combustion systems, it should be noted that the system and method according to the present invention could also be used for preventing oscillatory instability in any noisy or chaotic or turbulent systems; for example, structural instabilities that may arise due to aeroelastic flutter or flow induced vibration, aerodynamic and aeromechanical instabilities such as surge and, or instabilities arising in magnetohydrodynamics, or aeroacoustic instabilities in gas transport systems exhibiting pipe tone instabilities. Accordingly, the examples should not be construed as limiting the scope of the embodiments herein.

Figure 1:
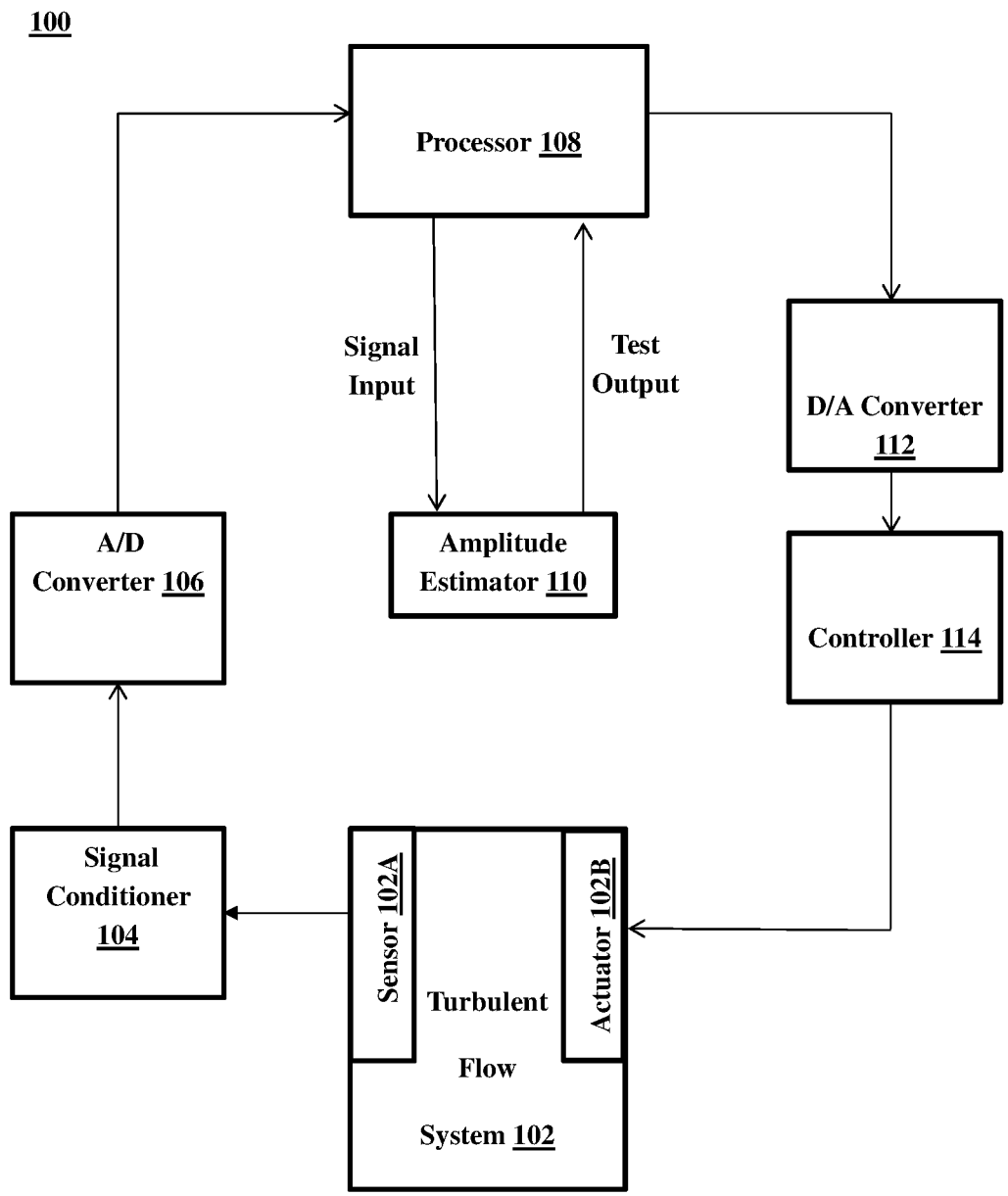
FIG. 1 is a block diagram illustrating a system used to estimate the amplitude of limit cycle oscillations, according to embodiments as disclosed herein.

According to embodiments disclosed herein, FIG. 1 is a block diagram of an apparatus 100. The apparatus 100 comprises of a sensor 102A attached to a turbulent flow system 102. The turbulent flow system 102 can be, but not limited to, gas turbine engines, wind turbines, structural elements facing turbulent flows like tall buildings, airplane wings, suspended bridges and the like. The sensor 102A obtains a signal corresponding to an oscillatory quantity of the turbulent flow system 102. The signal from the sensor 102A is passed on to a signal conditioner 104 which in turn conditions the signal into a suitable form which can be used for the analysis. An analog to digital (A/D) converter 106 converts the analog signals to digital signals which can be processed in a processor 108. In the processor 108, the signal is sent to an amplitude estimator 110 which estimates the amplitude of the oscillatory instability in the turbulent flow system 102. The estimated amplitude is passed back into the processor 108 which in response produces a control signal. The control signal is send to a digital to analog (D/A) converter 112 which in turn acts upon a controller 114 to enable an actuator 102B attached to the turbulent flow system 102 to take appropriate control measures.

Estimation of Spectral Measures:

The amplitude estimator 110 works as follows. The time series, t(k) of the oscillatory quantity, obtained from the turbulent flow system 102 using the sensor 102A, is Fourier transformed into a corresponding frequency domain and the Fourier series, A(f) is obtained. The spectral measures are then calculated based on the following formula:

$$M_{f_0,\Delta f,f_s}^{m,n,x,y} = \frac{\left(\sum_{i=-\Delta f/f_s}^{\Delta f/f_s} A(f_0 - (i*f_s))*((i*f_s))^m\right)^x}{\left(\sum_{i=-\Delta f/f_s}^{\Delta f/f_s} A(f_0 - (i*f_s))*((i*f_s))^n\right)^y}$$

Where, A(f) is the amplitude of the frequency spectrum for frequency f, $f_0$ is the frequency of interest where the oscillatory instability is expected, $f_s$ is the resolution of the frequency spectrum and $\Delta f$ is defined so that $[f_0-\Delta f, f_0+\Delta f]$ is the range of interest in the frequency spectrum where the spectral measure is evaluated and m, n, x, y are integers representing the index of the spectral measure. In another embodiment, the $M_{f_0,\Delta f,f_s}^{m,n,x,y}$ can also be evaluated using an integral form of equation, $$M_{f_0,\Delta f}^{m,n,x,y} = \frac{\left(\int_{f_0-\Delta f}^{f_0+\Delta f} A(f)(f_0 - f)^m df\right)^x}{\left(\int_{f_0-\Delta f}^{f_0+\Delta f} A(f)(f_0 - f)^n df\right)^y}$$

Figure 2:
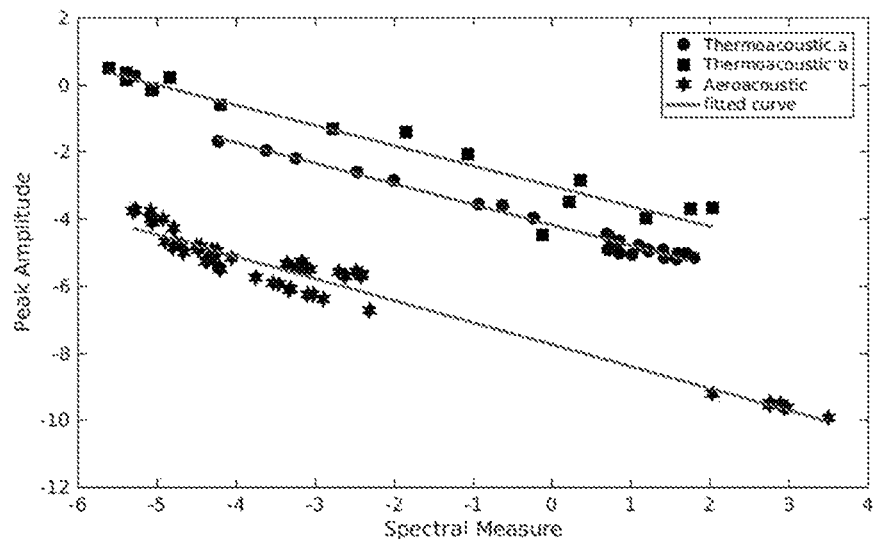
FIG. 2 is a graphical diagram illustrating the variation of spectral measure with amplitude of oscillations in a log-log plot, according to embodiments as disclosed herein.

In an embodiment, $M_{f_0,\Delta f,f_s}^{1,2,1,1}$ is evaluated for various fluid dynamic systems such as an aero acoustic system, and two configuration of gas turbine combustors as they approach oscillatory instabilities. $M_{f_0,\Delta f,f_s}^{1,2,1,1}$ versus peak amplitude of power spectra at different states of the system is illustrated in FIG. 2. It can be observed that in the log-log plot, the variation of $M_{f_0,\Delta f,f_s}^{1,2,1,1}$ versus peak amplitude is linear. Further, the slope of the line is same for all the cases. As we approach oscillatory instability, the amplitude of oscillation increases, and the value of the spectral measure reduces. The measure $M_{f_0,\Delta f,f_s}^{1,2,1,1}$ can thus be used as a precursor to an impending oscillatory instability. At the onset of oscillatory instability, the spectral measure crosses the threshold value. The threshold value can be appropriately fixed using conventional methods available in the existing state of the art.

Figure 3:
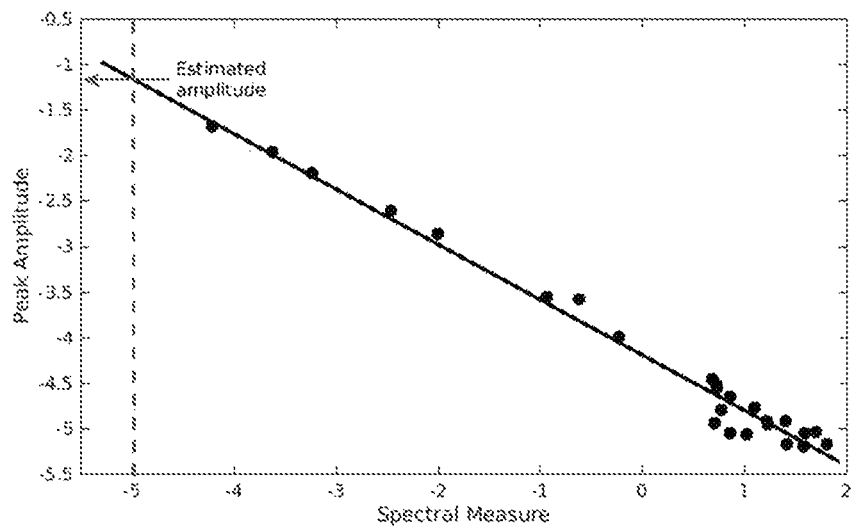
FIG. 3 is a graphical diagram illustrating the estimation of amplitude of oscillations for a system approaching oscillatory instability using spectral measure, according to embodiments as disclosed herein.

Estimation of Amplitude of Instability:

From FIG. 2, it can be seen that for all transitions, in a log-log plot, the spectral measure varies linearly with the peak amplitude of oscillations. It is shown in FIG. 2 that all systems have the same slope for the linear variation. In FIG. 3, the peak amplitude of oscillations during oscillatory instability is estimated corresponding to the aforementioned threshold value of the spectral measure by extrapolating the graph obtained in FIG. 2 towards the threshold spectral measure.

Once the amplitude of the oscillations during oscillatory instability is estimated, the estimated amplitude is compared with a threshold amplitude. If the estimated amplitude exceeds the threshold amplitude, oscillatory instability is detected and the necessary control actions are taken to drive the system away from an onset of oscillatory instability.

Further, it is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A system (100) to determine amplitude of oscillatory instability in a turbulent flow system (102), the system (100) comprising:
    a processor (108);
    a sensor (102A) provided in communication with the processor (108), configured to obtain at least one signal corresponding to the impending oscillatory instabilities of the turbulent flow system (102);
    an amplitude estimator (110) provided in communication with the sensor (102A) and the processor (108), wherein the amplitude estimator (110) includes a spectral measure estimator provided in communication with the processor (108), wherein the spectral measure estimator is configured to convert the at least one signal into a frequency spectrum, the amplitude estimator (110) configured to:
        estimate an amplitude of the impending oscillatory instabilities by estimating the value of spectral measure of the at least one signal, wherein the spectral measures are calculated based on following equation:

$$M_{f_0, \Delta f, f_s}^{m,n,x,y} = \frac{\left(\sum_{i=-\Delta f/f_s}^{\Delta f/f_s} A(f_0 - (i*f_s))*((i*f_s))^m\right)^x}{\left(\sum_{i=-\Delta f/f_s}^{\Delta f/f_s} A(f_0 - (i*f_s))*((i*f_s))^n\right)^y}$$

wherein A(f) is the amplitude for frequency f in the amplitude spectrum, $f_o$ is the frequency of interest where the oscillatory instability is expected, $f_s$ is a resolution of the amplitude spectrum and $\Delta f$ is defined so that $[f_0-\Delta f, f_0+\Delta f]$ is the range of interest in the amplitude spectrum where the spectral measure is evaluated and m, n, x, y are integers representing the index of the spectral measure; and
    detecting oscillatory instability upon the estimated amplitude exceeding a threshold amplitude;
    wherein the processor (108) generates a control signal based on the estimated amplitude that enables an actuator (102B) attached to the turbulent flow system to take control measures.

2. The system as claimed in claim 1, wherein the turbulent flow system (102) is at least one of gas turbine engine, wind turbine, structural elements facing turbulent flows like tall buildings, airplane wings and suspended bridges.

3. The system as claimed in claim 1, wherein a digital to analog convertor (112) is integrated with the system (100) to convert at least one digital signal obtained as an output from the amplitude estimator (110) to at least one analog signal that could be processed by a controller (114).

4. The system as claimed in 1, wherein the sensor (102A) includes a plurality of sensors that are configured to generate the at least one signal corresponding to the dynamics of the turbulent flow system (102).

5. The system as claimed in 1, wherein an analog to digital converter (106) is integrated with the system (100) to convert at least one analog signal generated by the sensor (102A) to at least one digital signal.

6. The system (100) as claimed in claim 1, wherein the system (100) further includes a signal conditioner (104) provided in communication with the sensor (102A) and configured to condition the at least one signal from the sensor (102A) in a form suitable to be transmitted to the analog to digital converter (106).

7. The system (100) as claimed in claim 1, wherein the controller (114) is configured to regulate the functioning of at least one of operating parameters of the turbulent flow system (102) by enabling the actuator (102B) to take appropriate control measures.

8. A method to determine amplitude of oscillatory instabilities in a turbulent flow system (102), the method comprising:
    obtaining, by an amplitude estimator (110), at least one signal corresponding to the oscillatory instabilities of the turbulent flow system (102) using a sensor (102A) connected to the amplitude estimator (110) and a processor (108) connected to the sensor (102A) and the amplitude estimator (110), wherein the sensor (102A) is mounted on the turbulent flow system (102);
    estimating, by the amplitude estimator (110), an amplitude of the impending oscillatory instabilities by estimating a spectral measure value of the at least one signal, wherein the spectral measures are calculated based on following equation:

$$M_{f_0, \Delta f, f_s}^{m,n,x,y} = \frac{\left(\sum_{i=-\Delta f/f_s}^{\Delta f/f_s} A(f_0 - (i*f_s))*((i*f_s))^m\right)^x}{\left(\sum_{i=-\Delta f/f_s}^{\Delta f/f_s} A(f_0 - (i*f_s))*((i*f_s))^n\right)^y}$$

wherein A(f) is the amplitude for frequency f in the amplitude spectrum, $f_o$ is a frequency of interest where the oscillatory instability is expected, $f_s$ is the resolution of the amplitude spectrum and $\Delta f$ is defined so that $[f_0-\Delta f, f_0+\Delta f]$ is a range of interest in the amplitude spectrum where the spectral measure is evaluated and m, n, x, y are integers representing the index of the spectral measure;
    converting the at least one signal into a amplitude spectrum, and
    detecting, by the amplitude estimator (110), oscillatory instability upon the estimated amplitude exceeding a threshold amplitude;
    wherein the processor (108) generates a control signal based on the estimated amplitude that enables an actuator (102B) attached to the turbulent flow system (102) to take control measures.

9. The method as claimed in claim 8, wherein a digital to analog convertor (112) communicably coupled to the amplitude estimator (110) is configured to convert at least one digital signal obtained as an output from the amplitude estimator (110) to at least one analog signal that could be processed by a controller (114).

10. The method as claimed in claim 8, wherein an analog to digital converter (106) is communicably coupled to the amplitude estimator (110) to convert at least one analog signal generated by the sensor (102A) to at least one digital signal.

11. The method as claimed in claim 8, wherein a controller (114), communicably coupled to the processor (108) and the amplitude estimator (110), is configured to regulate the functioning of at least one of operating parameters of the turbulent flow system (102) by enabling the actuator (102B) to take appropriate control measures.

* * * * *